United States Patent [19]

Mollison

[11] Patent Number: 4,490,324

[45] Date of Patent: Dec. 25, 1984

[54] NYLON FILM WITH IMPROVED SLIP CHARACTERISTICS AND PROCESS THEREFOR

[75] Inventor: Alistair N. Mollison, Kingston, Canada

[73] Assignee: Du Pont Canada Inc., Montreal, Canada

[21] Appl. No.: 606,401

[22] Filed: May 2, 1984

Related U.S. Application Data

[62] Division of Ser. No. 488,447, Apr. 25, 1983, abandoned.

[30] Foreign Application Priority Data

Jun. 29, 1982 [CA] Canada ................................. 406215

[51] Int. Cl.$^3$ ......................... B29C 25/00; C08J 7/08; C08K 5/20; C08L 77/00
[52] U.S. Cl. .................................. 264/211; 264/235; 264/346; 524/227; 524/230; 524/606
[58] Field of Search ..................... 264/211, 235, 346; 524/227, 230

[56] References Cited

U.S. PATENT DOCUMENTS

| | | | |
|---|---|---|---|
| T877,007 | 8/1970 | Uhline | 524/227 |
| 3,513,135 | 5/1970 | Hermann et al. | 524/230 |
| 3,595,827 | 7/1971 | Foster | 524/230 |
| 3,763,082 | 10/1973 | Elliot | 264/211 |
| 3,801,521 | 4/1974 | Smith | 524/227 |
| 4,290,935 | 9/1981 | Muraki | 524/227 |
| 4,395,510 | 7/1983 | Park | 524/230 |

FOREIGN PATENT DOCUMENTS

90346  8/1974  Japan ................................. 524/227

OTHER PUBLICATIONS

S.P.E. Journal, p. 1153, Oct. 1965, Advertisement for "Chemetron Wax-100".

Primary Examiner—C. Warren Ivy

[57] ABSTRACT

A process is disclosed for the manufacture of nylon packaging film having improved slip characteristics. In the process a homogeneous mixture is formed from a film-forming nylon resin and between 0.05 and 1.0 percent by weight thereof of a material selected from the group consisting of (1) secondary amides of the formula

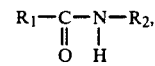

and (2) N, N' ethylene bis amides of the formula

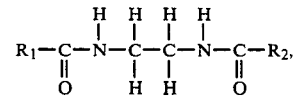

where $R_1$ and $R_2$ are aliphatic hydrocarbon chains of $C_{14}$–$C_{22}$. The homogeneous mixture is then extruded into film subsequently, the film is heated to a temperature between 40° C. and 150° C. for a period of 2 to 30 minutes in order to accelerate the development of improved film slip characteristics. The nylon film having improved slip characteristics is useful for the packaging of bacon and other processed meats.

2 Claims, No Drawings

NYLON FILM WITH IMPROVED SLIP CHARACTERISTICS AND PROCESS THEREFOR

This is a division of application Ser. No. 488,447 filed Apr. 25, 1983, now abandoned.

This invention relates to the production of nylon packaging films having improved slip characteristics i.e. a reduced coefficient of friction.

Nylon may be used in flexible packaging films as a single layer monofilm or it may be laminated to one or more other films to form a multiple layer film in which the nylon is an exterior surface.

A nylon film when extruded and quenched tends to be an amorphous, somewhat tacky material that lacks slip. The slip of a film refers to, for example, the ability of packages having an exterior surface of the film to slide freely across other packages wrapped in the same or other types of film or the ability to slide freely down chutes in conveyer systems used in the forming of the packages. Such chutes are utilized, for example, in the packaging of bacon and other processed meats. A measurement of the slip of a film is the film-to-film coefficient of friction, usually referred to as "coefficient of friction".

Measurements of coefficient of friction as used herein are obtained by the procedure of ASTM D1894-78 (Condition C).

The use of additives such as stearamides, oleamides and derivatives thereof to reduce the coefficient of friction of polyethylene film is known. For example U.S. Pat. No. 3,021,296 of C. J. Ammondson, issued Feb. 13, 1962 discloses a process for improving the slip characteristics of polyethylene film which comprises mixing film-forming polyethylene with between 0.01 and 0.5 percent be weight thereof of N, N' ethylene bis oleamide and melt extruding the mixture into film.

Several methods have been used heretofore to lower the coefficient of friction of nylon films. In one example, U.S. Pat. No. 3,763,082 of B. W. Elliott, issued Oct. 2, 1973 discloses mixing 500 to 5000 parts per million of micron-sized diatomaceous earth into nylon resin and extruding the mixture to produce a nylon film. The film so produced has a lower coefficient of friction after it has been heated to its thermoelastic state than a film extruded from the same nylon resin but without the diatomaceous earth. In another example, U.S. Pat. No. 3,980,570 of K. Okuda et al, issued Sept. 14, 1976 discloses mixing 25 parts carbon fibres and 75 parts nylon 66 chopped fibres and melting the mixture to produce a film having a low coefficient of friction. In a further example, U.S. Pat. No. 3,740,246 of M. Kuga et al, issued June 19, 1973 discloses applying a amino-alkyd resin coating to a nylon film to provide improved anti-blocking characteristics.

It has now been found that nylon film having a lower coefficient of friction may be produced by (1) forming a homogeneous mixture of a film-forming nylon resin and between 0.05 and 1.0 percent by weight thereof of certain secondary amides or N, N' ethylene bis amides and (2) melt extruding the mixture into film.

Accordingly the present invention provides a process for the manufacture of nylon film having improved slip characteristics which comprises the steps of (a) forming a homogeneous mixture of a film-forming nylon resin and between 0.05 and 1.0 percent by weight thereof of a material selected from the group consisting of (1) secondary amides of the formula

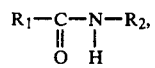

and (2) N, N' ethylene bis amides of the formula

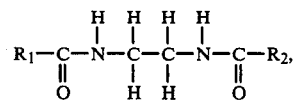

where $R_1$ and $R_2$ are aliphatic hydrocarbon chains of $C_{14}$–$C_{22}$; and (b) melt extruding the mixture into film.

The present invention also provides a nylon packaging film having improved slip characteristics, said film being formed from an admixture of (a) a film-forming nylon resin and (b) an amount of between 0.05 and 1.0 percent by weight thereof of a material selected from the group consisting of (1) secondary amides of the formula

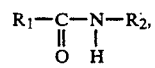

and (2) N, N' ethylene bis amides of the formula

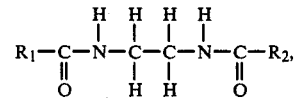

where $R_1$ and $R_2$ are aliphatic hydrocarbon chains of $C_{14}$–$C_{22}$.

The present invention further provides a composition for melt extrusion into a nylon packaging film having improved slip characteristics comprising (a) a film-forming nylon resin and (b) an amount of between 0.05 and 1.0 percent by weight thereof of a material selected from the group consisting of (1) secondary amides of the formula

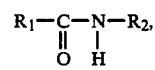

and (2) N, N' ethylene bis amides of the formula

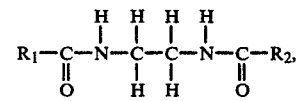

where $R_1$ and $R_2$ are aliphatic hydrocarbon chains of $C_{14}$–$C_{22}$.

In an embodiment of the present invention the nylon resin is selected from the group consisting of nylon 66, nylon 6, blends of nylon 66 and nylon 6 and copolymers of hexamethylene diamine adipate and ε-caprolactam.

In another embodiment of the present invention the material is an N, N' ethylene bis amide selected from N, N' ethylene bis stearamide and N, N' ethylene bis oleamide.

In yet another embodiment of the present invention the composition contains an amount of between 0.2 and 0.5 percent, by weight of the film, of N, N' ethylene bis stearamide.

In a further embodiment of the composition of the present invention the composition contains an amount of between 0.2 and 0.5 percent, by weight of the film, of N, N' ethylene bis oleamide.

The compositions used in the process of the present invention may be prepared by any suitable method yielding a substantially uniform mixture of the components. For example the components may be melt blended to make a concentrate of the nylon resin and secondary amide of N, N' ethylene bis amide and thereafter the concentrate may be melt blended with sufficient additional nylon resin to give the final desired composition.

The proportions of the components in the composition are important. Below about 0.05 percent by weight of secondary amide or N, N' ethylene bis amide the slip characteristics of the nylon film are not significantly improved. Amounts in excess of 1.0 percent do not further significantly improve the slip characteristics of the nylon film. Amounts of from 0.2 to 0.5 percent are especially preferred.

The compositions are composed essentially of a film-forming nylon and secondary amide or ethylene bis amide. Other components such as antistatic agents, heat stabilizing agents and the like may be added to the composition, provided, however, that the amount added is insufficient to substantially alter the slip properties of films made from the composition.

The nylon resins which may be used in the composition of the present invention include all film-forming, melt-extrudable nylon resins, particularly nylon 66, nylon 6, blends of nylon 66 and nylon 6 and copolymers of hexamethylene diamine adipate and $\epsilon$-caprolactam, more particularly such copolymers containing up to 25 percent by weight $\epsilon$-caprolactam and especially the copolymer of about 90 percent by weight hexamethylene diamine adipate and about 10 percent by weight $\epsilon$-caprolactam.

The preferred ethylene bis amides for use in the composition of the present invention are N, N' ethylene bis stearamide and N, N' ethylene bis oleamide.

Film may be made from the composition of the present invention by processes known in the art. For example, film may be extruded from a flat film die, passed in sequence over a chill roll and an annealing roll, moisturized with steam and then wound up.

It should be noted that when film is made from the composition of the present invention, the full improvement in the slip characteristics of the film may not be evident until about four to six weeks after the film has been made if the film is stored at room temperature (i.e. about 20° C.–25° C.). However, the improvement in slip characteristics will develop more rapidly if the film is heated, e.g. to a temperature of between 40° C. and 150° C., and especially between 40° C. and the glass transition temperature of the nylon film, for a period of from 2 to 30 minutes. The nylon film with the improved slip characteristics is useful, for example, for the packaging of bacon and other processed meats.

The present invention is illustrated by the following examples.

EXAMPLE 1

A copolymer of 90 percent by weight of hexamethylene diamine adipate and 10 percent by weight of $\epsilon$-caprolactam and having an RV* 41 was extruded using a ¾ inch extruder at a temperature of 265° C. and was cast into film having a thickness of 51 $\mu$m on a chill roll. Various levels of different slip additives were added to the copolymer before extrusion into film. In each case the slip additive was added by blending the copolymer with the required amount of a "masterbatch" of the slip additive and the copolymer. Coefficients of friction (film to film) were measured using the procedure of ASTM D1894-78 (Condition C) on both "as cast" film and on the film that had been "heat

*-RV (relative viscosity) is the ratio of the viscosity (in centipoises) at 25° C. of an 8.4 percent by weight solution of the polyamide in 90 percent (by weight) formic acid to the viscosity (in centipoises) at 25° C. of the 90 percent (by weight) formic acid alone. aged" i.e. heated for two minutes in an oven operating at 150° C. The results are shown in Table 1.

EXAMPLE 2

Compositions of nylon 66 homopolymer of 42 RV containing various levels of slip additive were extruded and cast into film having a thickness of 51 $\mu$m as in Example 1 except that the melt temperature was 277° C. Coefficients of friction were measured as in Example 1 on "as cast" film and on film "heat aged" for two minutes in an oven operating at various temperatures. The results are shown in Table 2.

EXAMPLE 3

Compositions of nylon 6 homopolymer of 60 RV containing various levels of slip additive were extruded and cast into film having a thickness of 51 $\mu$m as in Example 1, except that the melt temperature was 246° C. Coefficients of friction were measured as in Example 1 on "as cast" film and on film "heat aged" for two minutes in an oven operating at various temperatures. The results are shown in Table 3.

EXAMPLE 4

Compositions of nylon 66 resin of RV 42 containing 0.5 percent by weight of N, N' ethylene bis oleamide were extruded at a rate of 500 kg/hr. at 283° C. using a twin screw extruder. The film was extruded from a flat film die, passed in sequence over a chill roll maintained at 75° C. and an annealing roll set at 105° C., moisturized with steam to a level of 1 percent and subsequently wound up. The RV of the final film was 53. Film was produced at thicknesses of 19 $\mu$m and 51 $\mu$m at line speeds of 2.46 meters/second and 0.918 meters/second respectively. Coefficients of friction of the films were measured as in Example 1 after storage at ambient temperature and after storage at ambient temperature followed by heating at elevated temperature for a short period. The results are shown in Table 4.

EXAMPLE 5

Compositions of nylon 66 resin of RV 42 containing 0.5 percent by weight of N, N' ethylene bis stearamide were extruded into films having thicknesses of 19 $\mu$m and 51 $\mu$m under the same conditions as in Example 4. Coefficients of friction of the films were measured as in Example 1 after storage at ambient temperature and after storage at ambient temperature followed by heating at elevated temperature for a short period. The results are shown in Table 5.

TABLE 1

| Run No. | Slip Additive | Amount (Percent by Weight) | AS CAST FILM Static | AS CAST FILM Kinetic | HEAT AGED FILM Static | HEAT AGED FILM Kinetic |
|---|---|---|---|---|---|---|
| 1 | None (Control) | — | 5.9 | — | 5.7 | 0.8 |
| 2 | N,N' ethylene bis oleamide | 0.2 | 5.5 | — | 0.29 | 0.24 |
| 3 | N,N' ethylene bis oleamide | 0.5 | 5.9 | — | 0.24 | 0.19 |
| 4 | N,N' ethylene bis stearamide | 0.2 | 3.8 | — | 0.39 | 0.36 |
| 5 | N,N' ethylene bis stearamide | 0.5 | 3.8 | — | 0.46 | 0.36 |
| 6 | Stearyl erucamide | 0.05 | 0.42 | 0.34 | 0.31 | 0.24 |
| 7 | Stearyl erucamide | 0.2 | 6.1 | — | 0.67 | 0.63 |
| 8 | Stearyl erucamide | 0.5 | 0.44 | 0.31 | 0.38 | 0.32 |
| 9 | Stearyl erucamide | 0.1 | 3.2 | — | .61** | 0.46** |
| 10 | Oleyl palmitamide | 0.05 | 6.7 | — | 0.8 | 0.7 |
| 11 | Erucyl stearamide | 0.5 | 0.3 | 0.2 | 0.14 | 0.13 |

**two minutes at 120° C.

TABLE 2

| Run No. | Slip Additive | Amount (Percent by Weight) | AS CAST FILM Static | AS CAST FILM Kinetic | HEAT AGED FILM AT TEMP OF (°C.) | HEAT AGED FILM Static | HEAT AGED FILM Kinetic |
|---|---|---|---|---|---|---|---|
| 1 | None (Control) | — | 5.0 | — | — | — | — |
| 2 | N,N' ethylene bis oleamide | 0.1 | 1.07 | 0.57 | — | — | — |
|   | N,N' ethylene bis oleamide | 0.1 |   |   | 40 | 0.63 | 0.61 |
|   | N,N' ethylene bis oleamide | 0.1 |   |   | 80 | 0.55 | 0.42 |
|   | N,N' ethylene bis oleamide | 0.1 |   |   | 120 | 0.56 | 0.43 |
|   | N,N' ethylene bis oleamide | 0.1 |   |   | 150 | 0.53 | 0.38 |
| 3 | N,N' ethylene bis oleamide | 0.5 | 4.9 | — | — | — | — |
|   | N,N' ethylene bis oleamide | 0.5 |   |   | 40 | 1.07 | 0.57 |
|   | N,N' ethylene bis oleamide | 0.5 |   |   | 120 | 0.67 | 0.49 |
|   | N,N' ethylene bis oleamide | 0.5 |   |   | 150 | 0.41 | 0.30 |
| 4 | N,N' ethylene bis stearamide | 0.5 | 2.8 | — |   |   |   |
|   | N,N' ethylene bis stearamide | 0.5 |   |   | 40 | 1.10 | 0.61 |
|   | N,N' ethylene bis stearamide | 0.5 |   |   | 80 | 0.51 | 0.46 |
|   | N,N' ethylene bis stearamide | 0.5 |   |   | 120 | 0.54 | 0.43 |
|   | N,N' ethylene bis stearamide | 0.5 |   |   | 150 | 0.44 | 0.32 |

TABLE 3

| Run No. | Slip Additive | Amount (Percent by Weight) | AS CAST FILM Static | AS CAST FILM Kinetic | HEAT AGED FILM AT TEMP OF (°C.) | HEAT AGED FILM Static | HEAT AGED FILM Kinetic |
|---|---|---|---|---|---|---|---|
| 1 | None (Control) | — | 3.4 | — |   |   |   |
| 2 | N,N' ethylene bis oleamide | 0.1 | 1.06 | 0.76 |   |   |   |
|   | N,N' ethylene bis oleamide | 0.1 |   |   | 40 | 0.50 | 0.38 |
|   | N,N' ethylene bis oleamide | 0.1 |   |   | 80 | 0.48 | 0.51 |
|   | N,N' ethylene bis oleamide | 0.1 |   |   | 120 | 0.46 | 0.42 |
|   | N,N' ethylene bis oleamide | 0.1 |   |   | 150 | 0.42 | 0.38 |
| 3 | N,N' ethylene bis oleamide | 0.2 | 0.93 | 0.72 |   |   |   |
|   | N,N' ethylene bis oleamide | 0.2 |   |   | 120 | 0.50 | 0.49 |
|   | N,N' ethylene bis oleamide | 0.2 |   |   | 150 | 0.64 | 0.42 |

TABLE 3-continued

| Run No. | Slip Additive | Amount (Percent by Weight) | COEFFICIENT OF FRICTION | | | | |
|---|---|---|---|---|---|---|---|
| | | | AS CAST FILM | | HEAT AGED FILM | | |
| | | | Static | Kinetic | AT TEMP OF (°C.) | Static | Kinetic |
| | oleamide | | | | | | |

TABLE 4

| Storage or Treatment | COEFFICIENT OF FRICTION | | | |
|---|---|---|---|---|
| | Film having a thickness of 19 μm | | Film having a thickness of 51 μm | |
| | Static | Kinetic | Static | Kinetic |
| 17 days ambient storage (20°) | | | 1.7 | 0.69 |
| 17 days ambient storage and 5 minutes @ 150° C. | | | 0.28 | 0.24 |
| 39 days ambient storage | 0.5 | 0.25 | 0.63 | 0.43 |
| 39 days ambient storage and 5 minutes @ 40° C. | 0.35 | 0.30 | 0.53 | 0.30 |
| 67 days ambient storage | 0.27 | 0.30 | 0.54 | 0.48 |

TABLE 5

| Storage or Treatment | COEFFICIENT OF FRICTION | | | |
|---|---|---|---|---|
| | Film having a thickness of 19 μm | | Film having a thickness of 51 μm | |
| | Static | Kinetic | Static | Kinetic |
| 17 days ambient storage (20°) | | | 0.69 | 0.43 |
| 17 days ambient storage and 5 minutes @ 150° C. | | | 0.29 | 0.25 |
| 39 days ambient storage | 0.35 | 0.30 | 0.45 | 0.33 |
| 39 days ambient storage and 5 minutes @ 40° C. | 0.30 | 0.30 | 0.35 | 0.30 |

The embodiments of the invention in which an exclusive property or privilege is claimed are defined as follows:

1. A process for the manufacture of nylon film having improved slip characteristics which comprises the steps of
(a) forming a homogeneous mixture of a film-forming nylon resin and between 0.05 and 1.0 percent by weight of the nylon resin of a material selected from the group consisting of
(1) secondary amides of the formula

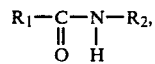

and
(2) N, N' ethylene bis amides of the formula

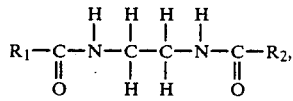

where $R_1$ and $R_2$ aliphatic hydrocarbon chains of $C_{14}$–$C_{22}$; and
(b) melt extruding the mixture into film,
(c) and thereafter heating the film to a temperature between 40° C. and 150° C. for a period of from 2 to 30 minutes.

2. The process of claim 1 wherein the nylon resin is selected from the group consisting of nylon 66, nylon 6, blends of nylon 66 and nylon 6 and copolymers of hexamethylene diamine adipate and ε-caprolactam and wherein the material is an N, N' ethylene bis amide selected from N, N' ethylene bis stearamide and N, N' ethylene bis oleamide.

* * * * *